United States Patent [19]
Inouye et al.

[11] 3,976,624
[45] Aug. 24, 1976

[54] METHOD FOR IMPROVING ADHESION OF METALLIC MATERIAL WITH VULCANIZABLE RUBBER COMPOSITION

[75] Inventors: Sakae Inouye; Suminobu Kurahashi; Norio Wada; Motokazu Kikuchi, all of Kodaira; Kinji Masuda, Higashimurayama; Tsuneharu Akiyama, Akishima; Toshiyuki Osaki, Higashimurayama, all of Japan

[73] Assignee: Bridgestone Tire Company Limited, Kyobashi, Japan

[22] Filed: Feb. 28, 1974

[21] Appl. No.: 447,048

Related U.S. Application Data

[63] Continuation-in-part of Ser. No. 211,971, Dec. 27, 1971, abandoned.

[30] Foreign Application Priority Data
Dec. 28, 1970 Japan.............................. 45-119694
June 16, 1971 Japan.............................. 46-42572

[52] U.S. Cl. ...................... 260/79.5 B; 260/45.7 R; 260/779 M; 260/780; 428/462; 428/465; 526/24; 526/22; 526/30; 526/44
[51] Int. Cl.² ...................... C08C 19/20; C08F 8/34
[58] Field of Search ................. 260/94.7 A, 79.5 B, 260/45.7 R, 779, 780; 450/612.5, 600, 601.5; 428/465, 462

[56] References Cited
UNITED STATES PATENTS

| | | |
|---|---|---|
| 2,241,801 | 5/1941 | Yohe et al. ................. 260/780 UX |
| 2,731,454 | 1/1956 | Edmonds ....................... 260/94.7 A |
| 3,542,727 | 11/1970 | Saville.......................... 260/92.3 X |
| 3,591,548 | 7/1971 | Beckman ................... 260/45.7 R X |
| 3,671,478 | 6/1972 | Doyle et al. ............... 260/94.7 A X |
| 3,812,087 | 5/1974 | Dillenschneider.......... 260/79.5 B X |
| 3,865,763 | 2/1975 | Feniak ............................ 260/780 X |
| T900,003 | 7/1972 | Arnold et al................... 260/79.5 B |

*Primary Examiner*—William F. Hamrock
*Attorney, Agent, or Firm*—Haseltine, Lake & Waters

[57] ABSTRACT

This invention relates to an improvement of the adhesion of a metallic material such as copper, copper alloys and other metals coated therewith with a vulcanizable rubber composition. It is realized by previously adding orthoboric acid or a metal borate to the rubber composition in order to proceed with metal-rubber bonding reaction and vulcanization reaction in good balance, and vulcanizing an assembly of the metallic material and the boric compound containing rubber composition closely contacted therewith.

4 Claims, 1 Drawing Figure

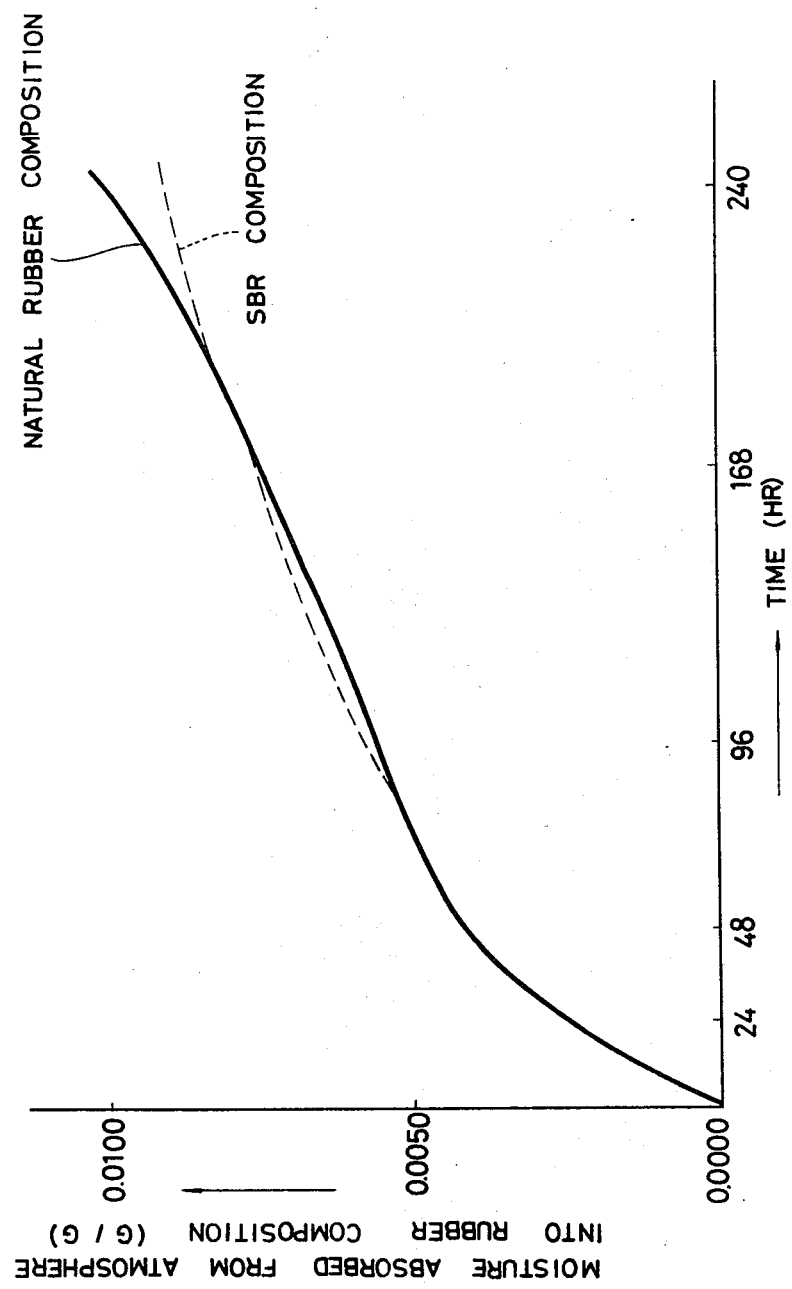

METHOD FOR IMPROVING ADHESION OF METALLIC MATERIAL WITH VULCANIZABLE RUBBER COMPOSITION

CROSS - REFERENCE TO RELATED APPLICATION

This application is a continuation-in-part application of Ser. No. 211,971 filed on Dec. 27, 1971 and now abandoned.

BACKGROUND OF THE INVENTION

1. Field of the Invention

This invention relates to an improved method for vulcanizingly bonding copper, copper alloys or other metals coated therewith to a rubber composition combined with sulphur and/or organic sulphur compounds.

2. Description of the Prior Art

Various rubber articles are generally made of rubber composition and other materials. For instance tires, belts, hoses and resilient mounting are made of rubber and fibrous materials and/or metallic materials. The qualities or life of such articles are considerably affected by properties which are held by each of said materials and interrelated characteristics such as adhesiveness between said materials when the rubber articles have been produced.

It has been known, in making the rubber article reinforced, for instance, with organic fibers, that moisture involved in the fibers and/or the rubber composition causes deterioration of the organic fibers, above all the lowering of strength due to heating in a high moisture atmosphere during the vulcanization of the rubber composition together with said organic fibers.

It has been found according to U.S. Pat. No. 3,671,478 that adding boric oxide ($B_2O_3$) to the rubber composition as a desiccant is very effective for preventing deterioration of the organic fibers, principally the lowering of the strength thereof caused by heating in a high moisture atmosphere, as compared with the effectiveness obtained by using the conventional desiccant such as calcium oxide (CaO). It is disclosed therein that lowering of the adhesion between the rubber and organic fibers can also be prevented thereby. This is understood to be due to the fact that the moisture in the organic fibers and/or the rubber composition is chemically combined with boric oxide contained therein as a desiccant so as to prevent a layer (in said U.S. Patent resorcin-formaldehyde-latex is used for said layer) from being swollen and subjected to hydrolysis. In such method of adding a desiccant such as $B_2O_3$, CaO to the rubber composition, however, there is a problem that the greater the moisture content therein, the greater the amount of desiccant which must be added and the addition thereof tends to make the rubber composition itself more moisture absorptive.

As for rubber articles reinforced with metallic material, there would be substantially no problem of deterioration due to heating in the high moisture atmosphere different from those reinforced with the organic fibers, but only the adhesion between the rubber composition and metallic material would be in question. For bonding the rubber composition to the metallic material, various methods have been proposed. So far as copper, copper alloys and other metals coated therewith are concerned, however, there is no need for using any adhesive, but it is possible to attain the required bonding merely by subjecting the assembly to be bonded to vulcanization treatment whereby sulphur combined in the rubber composition serves to realize the bonding between the metal and the rubber composition.

This method has been found to be simple and useful since it requires no troublesome treatments such as application of the adhesive, drying and the like.

The mechanism of this bonding has been considered to be due to Cu—S—C≡ bonding formed by sulphur (S) bridging between copper (Cu) and carbon (C) in the rubber composition. Although there has been no experimental proof with respect to actual formation of this bridging, there are various theoretical views among which typical are "Rubber to Metal Bonding" authored by S. Buchan and published by Crosby Lockwood and Son Ltd., 1959; Yamato and Tanaka, Kogyo Kagaku Zasshi, 61, 252, 257 and 260 (1958) and Yamato and Tanaka, Nippon Gomu Kyokai Shi (J. of the Society of Rubber Industry, Japan), 32, 675 (1959).

The inventors have found that it is very important for attaining the desired vulcanization bonding to advance the vulcanizing reaction of the rubber in good balance of formation of said bonding or bridging in the boundary area between the metal and the rubber composition with simultaneous vulcanization of said rubber composition in the neighborhood of said boundary area, in view of the fact that adhesion therebetween is considerably lowered when the moisture is present in the rubber composition.

In order to attain the firm adhesion, according to said finding, the formation of the bonding Cu-S-C≡ around the boundary area is necessary. However as suggested by Buchan, said formation should be advanced in good balance together with the vulcanization in said rubber composition without too great an amount of sulphur-sulphur bonding formation in said Cu—S—C≡ bonding or an excess amount of Cu-S bonding therein. The reason why the presence of moisture when vulcanization bonding is carried out results in poor adhesion is explained by the fact that the moisture promotes the formation of too much copper sulphide around the boundary area while the vulcanizing reaction in the rubber composition and consequently formation of the strong bonding of Cu—S—C≡ around the boundary area is harmed thereby.

Since so much time is required for mixing the rubber composition and assemblying the rubber composition with the metallic material to be subjected to vulcanization bonding, the unvulcanized rubber composition inevitably absorbs the moisture under the ambient conditions of high moisture and high temperature, which causes unsatisfactory bonding between the metallic material and the rubber composition so as to adversely affect the qualities of the product.

The inventors have made studies for finding improved method for vulcanization bonding without removing the moisture in question by using the desiccant in controlling the excessive reaction of copper with sulphur combined in the rubber composition which is apt to be advanced in the presence of the moisture as referred to above. As a result thereof it has been found that the addition of orthoboric acid or a metal borate to the rubber composition combined with sulphur and/or organic sulphur compounds can unexpectedly proceed with the bonding reaction between the metallic material and the rubber composition around the boundary area in good balance with the vulcanizing reaction in the rubber composition so that satisfactory adhesion can be attained despite the presence of a considerably greater amount of the moisture.

SUMMARY OF THE INVENTION

This invention is directed to improving the adhesion of a metallic material such as copper, copper alloys and other metals coated therewith with a vulcanizable rubber composition combining sulphur and/or organic sulphur compounds therein. It is realized by previously adding orthoboric acid or a metal borate to the rubber composition in order to keep the good balance of the bonding reaction around the boundary area of the metallic material and the rubber composition with the vulcanizing reaction of the rubber composition, and by vulcanizing the assembly of the metallic material and the boric containing rubber composition closely contacted therewith.

It should be noted that the boric compound such as orthoboric acid and the metal borates such as zinc borate, manganese borate, calcium borate, lead borate, cobalt borate, sodium borate is used not as a desiccant in the present invention, and consequently the improvement of adhesion according to the invention can be attained by not removing the moisture in the rubber composition.

Since the boric compound as referred to above is added according to the invention so as to control the excessive reaction of copper with sulphur despite the presence of the moisture in the rubber composition, there is no need for increasing the amount of orthoboric acid or the metal borate depending on the amount of the moisture content in the rubber composition different from the method wherein the desiccant is added and addition of such boric compound will not make the rubber composition more moisture absorptive.

As vulcanization bonding of the metallic material to the unvulcanized rubber composition can be stably carried out without reducing the adhesiveness according to the invention even under the ambient conditions of high moisture and high temperature and consequently even if the unvulcanized rubber composition absorbs the moisture in the ambient air, the invention has valuable application in such industries for manufacturing rubber-metal assembly articles such as tires, belts, hoses, resilient mounting and the like.

THE BRIEF DESCRIPTION OF THE DRAWING

The sole FIGURE of the accompanying drawing graphically shows the amount of the moisture to be increased with respect to time when the natural and unvulcanized SBR rubber composition are left to stand under ambient conditions of high moisture and high temperature.

DESCRIPTION OF THE PREFERRED EMBODIMENTS

The rubber composition to be bonded according to the invention is vulcanizable natural rubber or a synthetic rubber composition or blend thereof to which sulphur and/or an organic sulphur compound is combined.

The copper alloy to be bonded according to the invention is brass, bronze and the like. The other metals coated with copper or copper alloys can be iron, aluminum, zinc, cadmium, titanium and alloys thereof.

The boric compound to be used according to the invention is orthoboric acid or a metal borate. The metal to form the borates is not always critically limited so far as the effect or end of the invention is concerned, but from a practical point of view it is sodium, calcium, zinc, lead, manganese and cobalt. The boric compound is preferably added to the rubber composition in as finely pulverized a form as possible.

The amount of the boric acid to be added according to the invention is above 0.1 weight parts per 100 weight parts of the elastomer in the rubber composition. When the amount is greater than 10 weight parts, the properties of the vulcanized rubber composition such as tensile strength and elongation at breaking is lowered, and thus the upper limit is preferably below 10 weight parts, and more preferably below 5 weight parts.

Before bonding to the rubber composition, the metallic material may be subjected to the usual physical or chemical pretreatment such as brasting, acid washing and the like. It is of course possible to apply the usual adhesive on the surface of the metallic material to be bonded on the one hand and to add the conventional adhesive auxiliary to the rubber composition on the other hand.

The invention will be explained in more detail in the following Examples which are given merely for the purpose of explanation but not for limiting the invention thereto.

EXAMPLE 1

A plurality of pieces of fabric prepared by coating brass plated steel cords each arranged in parallel with spacing of 3 mm with the rubber composition comprising 100 parts natural rubber, 50 parts furnace carbon black, 5 parts zinc oxide, 1 part antioxidant, 0.8 parts vulcanization accelerator and 3 parts sulphur respectively by weight, some of which were added with nothing to be used as a control but the others of which were added with various boric additives as referred to above according to the invention respectively in the amount of 1.5 weight parts relative to 100 weight parts natural rubber, were left in an atmosphere at a temperature of 25°C and of a relative humidity of 90% for variously extended times up to 240 hours, and then subjected to vulcanization at 135°C for 60 minutes. The results of adhesion are shown in the following Table I, in which the adhesion force was determined as follows. Each of the fabrics was buffed after said vulcanization at one end thereof so as to expose the ends of the cords, which were turned up on alternate cords to be joined together and subjected to a tensile tester so that said metal cords may be plucked off from the rubber-metal assembly. Resistance to delamination or peeling strength as determined was converted into that per cord, whose resulting value was used for representing the adhesion force (Kg/Cord) in said Table.

It will be readily appreciated therefrom that the control pieces added with no boric additive deteriorated in their ability of adhesion increasingly rapidly with respect to time.

Test pieces of the unvulcanized rubber composition as used as a control in the experiments in said Table 1 were left in an atmosphere of 25°C and 90% relative humidity for variously extended times up to 240 hours to determine the moisture absorbed from the atmosphere into the rubber composition which increases as time passes, the results being illustrated in the accompanying drawing, together with the results obtained in respect of styrenebutadiene rubber composition to be referred to hereinafter.

Meanwhile, as to the other rubber-metal assembly, test pieces of the same rubber composition but with the boric additives added according to the invention, there can be observed in said Table no actual appreciable deterioration in the adhesion ability regardless of the extended time during which the test pieces were left in the humid atmosphere. It can be made possible by the invention to store the rubber composition material under the humid conditions for a considerable time before actually joining with the metallic material to be vulcanized for concurrently attaining adhesion therebetween without fear of deterioration of the adhesion ability. It will be appreciated by persons skilled in the art that such fact can contribute greatly to the rubber industry in respect of production control and product quality.

Test pieces of the unvulcanized SBR composition as used as control without adding any boric additive (No.1-Table II) were left similarly in the atmosphere at 25°C and of 90% relative humidity for various extended times up to 240 hours to determine the moisture content absorbed from the atmosphere into the rubber composition which increases with respect to time, which results are shown in the accompanying drawing.

It will be readily appreciated from said Tables that the addition of the boric additives according to the invention can effectively avoid deterioration of the unvulcanized fabrics left under humid conditions for considerable periods of time in their adhesion ability.

TABLE II

| | Adhesion Force (SBR) Boric Additive 1.5 Parts by Weight to 100 Parts SBR | Time During Which Unvulcanized Fabrics Were Left Under Humid Condition | | | | | |
|---|---|---|---|---|---|---|---|
| | | 3 Hrs. | 24 Hrs. | 48 Hrs. | 96 Hrs. | 168 Hrs. | 240 Hrs. |
| 1 | None (Control) | 6.0 | 4.4 | 3.9 | 3.5 | 2.0 | 1.1 |
| 2 | Orthoboric Acid | 5.9 | 6.0 | 6.0 | 5.6 | 5.4 | 5.2 |
| 3 | Zinc Borate | 6.0 | 6.0 | 5.9 | 5.7 | 5.5 | 5.4 |
| 4 | Manganese Borate | 5.8 | 6.0 | 5.9 | 5.6 | 5.4 | 5.5 |
| 5 | Calcium Borate | 6.1 | 6.1 | 5.7 | 5.8 | 5.3 | 5.4 |
| 6 | Lead Borate | 5.7 | 5.7 | 5.9 | 5.6 | 5.4 | 5.2 |

TABLE I

| | Adhesion Force (NR) Boric Additive 1.5 parts by 100 parts NR | Time During Which Unvulcanized Fabrics Were Left Under Humid Condition | | | | | |
|---|---|---|---|---|---|---|---|
| | | 3 Hrs. | 24 Hrs. | 48 Hrs. | 96 Hrs. | 168 Hrs. | 240 Hrs. |
| 1 | None (Control) | 6.0 | 4.4 | 3.9 | 3.5 | 2.0 | 1.1 |
| 2 | Orthoboric Acid | 6.4 | 6.1 | 6.0 | 5.8 | 6.3 | 5.7 |
| 3 | Zinc Borate | 6.3 | 6.2 | 6.0 | 5.6 | 5.6 | 5.2 |
| 4 | Manganese Borate | 6.0 | 6.0 | 5.3 | 6.3 | 5.2 | 5.0 |
| 5 | Calcium Borate | 6.0 | 6.0 | 6.5 | 5.6 | 4.4 | 4.4 |
| 6 | Lead Borate | 5.9 | 6.1 | 6.3 | 5.5 | 5.7 | 5.2 |
| 7 | Cobalt Borate | 6.0 | 5.8 | 5.3 | 5.6 | 4.5 | 4.4 |
| 8 | Sodium Borate | 6.0 | 5.8 | 5.6 | 5.2 | 4.8 | 4.3 |

The SBR composition as used comprised 100 parts SBR-1500, 50 parts furnace carbon black, 5 parts zinc white, 1 part antioxidant, 1.2 parts vulcanization accelerator and 3 parts sulphur respectively by weight.

TABLE III

| | Adhesion Force (NR-SBR) Boric Additive 1.5 Weight to 100 Parts Blended Rubber | Time During Which Unvulcanized Fabrics Were Left Under Humid Condition | | | | | |
|---|---|---|---|---|---|---|---|
| | | 3 Hrs. | 24 Hrs. | 48 Hrs. | 96 Hrs. | 168 Hrs. | 240 Hrs. |
| 1 | None (Control) | 5.4 | 4.0 | 3.9 | 3.5 | 2.0 | 1.1 |
| 2 | Orthoboric Acid | 5.6 | 5.4 | 5.5 | 5.3 | 5.2 | 5.1 |
| 3 | Zinc Borate | 5.5 | 5.6 | 5.6 | 5.2 | 5.3 | 5.2 |

EXAMPLE 2

Similarly as in Example 1, various boric additives were added to styrene-butadiene rubber or SBR composition and to natural rubber blended with SBR composition so as to confirm and demonstrate the effect of the invention, which results are shown in Tables II and III.

The rubber blend rubber composition as used comprised 30 parts SBR-1500, 70 parts natural rubber, 50 parts furnace carbon black, 5 parts zinc white, 1 part antioxidant and 3 parts sulphur respectively by weight.

EXAMPLE 3

Similar as in Example 1, unvulcanized test fabrics comprising natural rubber composition with the boric additive according to the invention were left in the atmosphere at 25°C and of 90% RH for determining the effective amount of said additive in respect of normal boric acid and zinc borate, the result of which is shown in Table IV.

It is to be appreciated therefrom that the addition thereof is made in amounts ranging from a small amount such as 0.1 weight parts to several weight parts relative to 100 weight parts of the material elastomer in the rubber composition. Such range of the amount of the additive is quite suitable as an additive to the rubber composition without fear of any unsatisfied affect on the properties of the vulcanized product.

TABLE IV

| Fabric (NR) | 1 | 2 | 3 | 4 | 5 | 6 | 7 |
|---|---|---|---|---|---|---|---|
| Additive | | | | | | | |
| Orthoboric Acid | — | 0.1 | 0.5 | 1.0 | 3.0 | — | — |
| Zinc Borate | — | — | — | — | — | 1.0 | 5.0 |
| Time During Which Unvulcanized Fabrics Were Left Under Humid Condition | Adhesion Force | | | | | | |
| 3 Hours | 6.0 | 5.9 | 6.1 | 6.2 | 6.1 | 6.1 | 6.6 |
| 24 Hours | 4.4 | 5.5 | 6.0 | 6.0 | 5.8 | 6.0 | 6.3 |
| 48 Hours | 3.9 | 4.6 | 5.8 | 6.0 | 5.9 | 5.9 | 6.0 |
| 96 Hours | 3.5 | 4.5 | 5.8 | 5.8 | 5.8 | 5.9 | 5.8 |
| 168 Hours | 2.0 | 4.1 | 5.4 | 5.7 | 5.7 | 5.3 | 5.3 |
| 240 Hours | 1.1 | 3.6 | 5.3 | 5.5 | 5.7 | 5.1 | 5.3 |

What is claimed is:

1. A method for improving the adhesion of a rubber composition, containing a sulphur vulcanizer, with copper, brass or other metals coated therewith said method comprising adding at least one compound selected from the group consisting of orthoboric acid, zinc borate, manganese borate, calcium borate, lead borate, cobalt borate and sodium borate to the rubber composition in a ratio of 0.1 to 5 weight parts of said boric acid compound to 100 weight parts of an elastomer in said rubber composition, closely contacting the metal to be coated with the rubber composition containing the boric acid compound and then vulcanizing the resulting rubber composition, whereby said metal adheres to the vulcanized rubber composition.

2. A method as claimed in claim 1 comprising storing the rubber composition containing the boric acid compound for an extended period under ambient conditions before vulcanization, said composition being capable of absorbing moisture from the atmosphere during such storage without substantial effect on the subsequent vulcanization and resulting adhesion due to control by the boric acid compound of the reaction of the sulphur with the metal to be coated despite the presence of the absorbed moisture.

3. A method as claimed in claim 2 wherein the time of storage of the rubber composition containing the boric acid compound is substantially indepenent of the resulting adhesion of the metal with the vulcanized rubber composition.

4. A method as claimed in claim 3 wherein said time of storage is up to 240 hours.

* * * * *